(12) United States Patent
McHugh

(10) Patent No.: US 10,499,201 B2
(45) Date of Patent: Dec. 3, 2019

(54) EVENT-BASED INTERACTIVE DEVICE SYSTEM

(71) Applicant: Elizabeth McHugh, Nashville, TN (US)

(72) Inventor: Elizabeth McHugh, Nashville, TN (US)

(73) Assignee: HURDL, INC., New York, NY (US)

( * ) Notice: Subject to any disclaimer, the term of this patent is extended or adjusted under 35 U.S.C. 154(b) by 0 days.

(21) Appl. No.: 16/120,655

(22) Filed: Sep. 4, 2018

(65) Prior Publication Data

US 2018/0376296 A1    Dec. 27, 2018

Related U.S. Application Data

(63) Continuation of application No. 15/385,536, filed on Dec. 20, 2016, now Pat. No. 10,097,968.

(60) Provisional application No. 62/271,729, filed on Dec. 28, 2015, provisional application No. 62/271,163, filed on Dec. 22, 2015.

(51) Int. Cl.
*H04W 4/12* (2009.01)
*H04W 4/08* (2009.01)
*H04W 76/11* (2018.01)
*H04W 8/18* (2009.01)

(52) U.S. Cl.
CPC .............. *H04W 4/08* (2013.01); *H04W 4/12* (2013.01); *H04W 76/11* (2018.02); *H04W 8/186* (2013.01)

(58) Field of Classification Search
CPC ......... H04W 4/08; H04W 76/11; H04W 4/12; H04W 8/186; H04W 76/021; H04H 60/32; H04L 12/26
See application file for complete search history.

(56) References Cited

U.S. PATENT DOCUMENTS

| 8,502,480 | B1 | 8/2013 | Gerszberg et al. |
| 8,941,332 | B2 | 1/2015 | Gerszberg |
| 9,066,383 | B2 | 6/2015 | Gerszberg |
| 9,686,843 | B2 | 6/2017 | Van de Sluis et al. |
| 9,722,649 | B2 | 8/2017 | Leclerc et al. |
| 10,097,968 | B2 | 10/2018 | Mchugh |
| 2003/0216151 | A1 | 11/2003 | Kitano et al. |

(Continued)

FOREIGN PATENT DOCUMENTS

| CN | 202353643 | 7/2012 |
| WO | 2014182161 | 11/2014 |

OTHER PUBLICATIONS

International Search Report and Written Opinion issued in PCT Application No. PCT/US2016/068113 dated Mar. 10, 2017.

(Continued)

*Primary Examiner* — Chuong A Ngo
(74) *Attorney, Agent, or Firm* — Workman Nydegger

(57) ABSTRACT

A computer system for activating an event-based interactive device can be configured to receive, through a data input API, a unique device identifier. The unique device identifier may be associated with the event-based interactive device. Additionally, the system can be configured to receive user information associated with a user of the event-based interactive device. The system can classify event-based interactive devices into groups based upon the user information. Further, the system can be configured to transmit a command to at least one group of event-based interactive devices.

20 Claims, 4 Drawing Sheets

(56) References Cited

U.S. PATENT DOCUMENTS

| | | | |
|---|---|---|---|
| 2004/0098409 A1* | 5/2004 | Kelleher | G16H 10/20 |
| 2007/0144047 A1 | 6/2007 | Singh | |
| 2007/0171046 A1* | 7/2007 | Diem | G06Q 10/00 |
| | | | 340/539.13 |
| 2010/0085279 A1 | 4/2010 | Repko | |
| 2011/0202947 A1* | 8/2011 | Gupta | H04N 21/26266 |
| | | | 725/14 |
| 2014/0184386 A1 | 7/2014 | Regler et al. | |
| 2014/0217901 A1* | 8/2014 | Logiudice | H05B 33/0845 |
| | | | 315/152 |
| 2015/0081624 A1 | 3/2015 | Masse et al. | |
| 2015/0281009 A1* | 10/2015 | Melcher | G06T 11/206 |
| | | | 709/224 |
| 2015/0381793 A1 | 12/2015 | Cerda et al. | |
| 2017/0006414 A1 | 1/2017 | Tomassini | |

OTHER PUBLICATIONS

U.S. Appl. No. 15/385,536, Oct. 19, 2017, Office Action.
U.S. Appl. No. 15/385,536, Jun. 7, 2018, Notice of Allowance.
"The LED Artist A12-RGB LED Wearable", Adafruit, accessed on Apr. 29, 2019 via https://www.adafruit.com/product/1574, pp. 1-4.
"Wearable LED strips lighting", Alibaba products, accessed on Apr. 29, 2019 via https://www.alibaba.com/showroom/wearable-led-strips-lighting.html, pp. 1-8.
Gripsborn, "How to drive RGB LEDs in mobile phones", Mar. 15, 2005, EE Times, pp. 1-5, accessed on Nov. 18, 2015 via http://www.eetimes.com/document.asp?doc_id=1273005, pp. 1-5.
"RGBW LED Panels (Chromotherapy)", Itel—Driving Healthcare Changes, 2019, accessed on Apr. 29, 2019 via https://www.itelte.it/en/cnt/rgbw-led-chromotherapy, pp. 1-4.
Kinetic Technologies, Mobile phone and smartphone LED drivers, 2015, accessed on Nov. 18, 2015 via http://www.kinet-ic.com/application_list.php?cid/1.htm, pp. 1.
Koskeia, "Color-Management LED Drivers Have a Bright Future", 2011, Texas Instruments, Power Designer, Literature No. SNVA600, pp. 1-10.
Lacy, "Ticketmaster bets on smarter tickets to outsmart fraudsters", Jul. 18, 2017, The Drum, accessed on Apr. 29, 2019 via https://www.thedrum.com/news/2017/07/18/ticketmaster-bets-smarter-tickets-outsmart-fraudsters, pp. 1-4.
Ronzio et al., "Why wearable tech is the key to audience engagement", Cramer—A brand experience agency, accessed on Apr. 29, 2019 via https://www.cramer.com/story/event-wearables-drive-engagement/, pp. 1-9.

* cited by examiner

EVENT-BASED INTERACTIVE DEVICE SYSTEM

CROSS-REFERENCE TO RELATED APPLICATIONS

This application is a continuation of U.S. application Ser. No. 15/385,536 filed on Dec. 20, 2016 entitled "EVENT-BASED INTERACTIVE DEVICE SYSTEM", which claims the benefit of and priority to U.S. Provisional Patent Application Ser. No. 62/271,163 filed on Dec. 22, 2015 entitled "EVENT-BASED INTERACTIVE DEVICE SYSTEM," and to U.S. Provisional Patent Application Ser. No. 62/271,729 filed on Dec. 28, 2015 entitled "EVENT-BASED INTERACTIVE DEVICE SYSTEM." All of the referenced applications are expressly incorporated herein by reference in their entirety.

BACKGROUND OF THE INVENTION

Tracking user data and associating disparate data with particular users has become a multi-billion-dollar industry and is in many ways the foundation of the Internet Age. User data that has been properly associated with a particular user can be highly valuable for many purposes including advertising. For example, different advertisers may wish to target different demographics of potential customers. Additionally, advertisers may also desire to target potential customers who have purchased particular items in the past or participated in particular events, particularly immediately following a live event.

Many different groups and organizations attempt to gather data relating to their customers and/or fans. For example, many bands, sports teams, performers, conventions, and venues now provide fans with custom-built apps. The apps provide fans with opportunities to connect with the artists, athletes, and/or performers that they admire. In turn, the apps provide the artists, athletes, performers, and/or venues with a method for gathering user information about their fans and generating excitement among their fan base.

A particular difficulty, however, exists in associating fans with tickets purchased for an event and engaging those attendees in unique, person-specific ways to enhance the experience of attending an event. Similar difficulties exist when associating fans who are otherwise participating in an event (e.g., watching an event on television) with information about those respective fans. For example, many concert tickets are purchased by large scale ticket resellers. These ticket resellers then sell the concert tickets to the fans. In this arrangement, the ticket resellers may gather data relating to individual fans who purchase the tickets, but this data is generally not passed on to the artists, sports teams, performers, and/or venues that are actually holding the event. Additionally, even this data can be incomplete and unreliable. Associating fans who attend events with user information stored about those fans can provide high quality and extremely valuable advertising data. Accordingly, there are problems within the art to be overcome.

BRIEF SUMMARY OF THE INVENTION

Embodiments of the present invention comprise systems, methods, and apparatus configured to activate and control event-based interactive devices. In particular, embodiments of the present invention comprise computer systems configured to receive a unique identifier from a device, gather personal identifying information from a third-party app or user database, and activate an event-based interactive device. The computer system can then send information to an on-site controller that causes the event-based interactive device to activate based upon pre-defined criteria relating to the user.

Embodiments of the present invention can comprise a computer system for activating an event-based interactive device. The system can be configured to receive, through a data input API, a unique device identifier. The unique device identifier may be associated with the event-based interactive device. Additionally, the system can be configured to receive user information associated with a user of the event-based interactive device. The system may also classify event-based interactive devices based upon the user information. Further, the system can be configured to transmit the unique device identifier to an interactive device control computer. The interactive device control computer can be in communication with a transmitter that is configured to transmit commands to the event-based interactive device.

Disclosed embodiments also include systems comprising an event-based interactive device. The event-based interactive device includes a unique device identifier and a visual display device. The system also includes a device activation server configured to receive the unique device identifier and activate the event-based interactive device. The device activation server comprises a user information database. The system further includes an interactive device control computer in communication with the device activation server and configured to receive unique device identifier from the device activation server, and communicate commands to the event-based interactive device.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
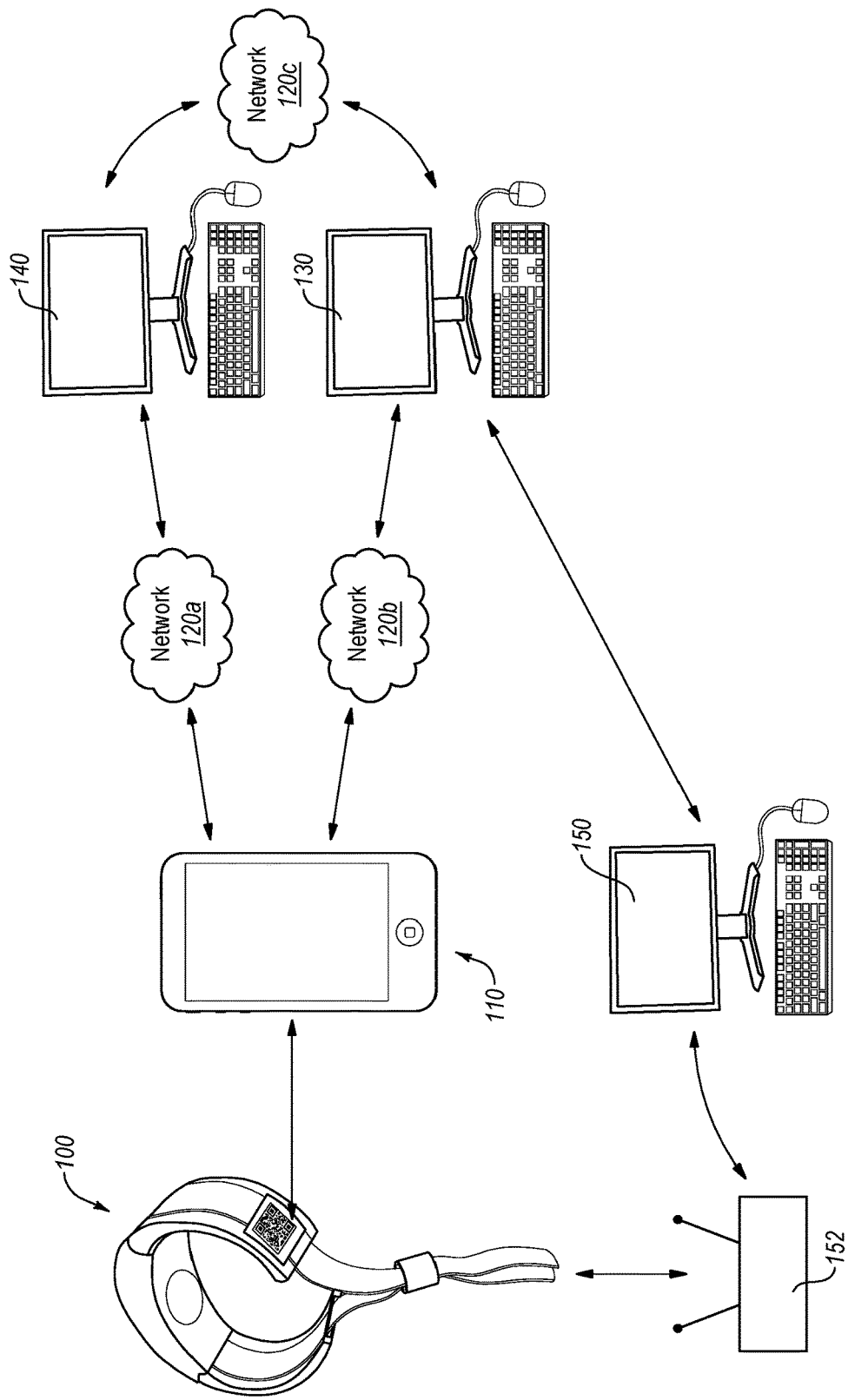
FIG. 1 illustrates a schematic diagram of an embodiment of an event-based interactive device activation and control system.

The present invention extends to systems, methods, and apparatus configured to activate and control event-based interactive devices. In particular, embodiments of the present invention comprise computer systems configured to receive a unique identifier from a device, gather personal identifying information from a third-party app or user database, and activate an event-based interactive device. The computer system can then send information to an on-site controller that causes the event-based interactive device to activate based upon pre-defined criteria relating to the user.

Accordingly, embodiments of the present invention provide event-based interactive devices that users can activate through a third-party application or fan app (also referred to herein as an "event-based application"). For example, a third-party app, such as SPOTIFY, SONGKICK, UBER, or SNAPCHAT can embed the data input API into their respective application. The data input API may be manifested within the third-party app as a particular icon or command. Activating the icon or command may provide a method for activating the event-based interactive device.

In additional or alternative embodiments, users can also activate event-based interactive devices by texting a unique device identifier, such as a serial number, associated with the event-based interactive device to an event phone number. The event phone number may be printed on the event-based interactive devices or may be otherwise provided to the user. The event phone number may be associated with a device activation server. The device activation server is capable of receiving unique device identifiers that are associated with event-based interactive devices to activate and receiving phone numbers (using conventional caller ID) associated with users of each activated event-based interactive device.

Event-based interactive devices can comprise purpose-made wearables with or without associated displays and antennas, mobile computing devices with displays, mobile computer devices with RGB LEDs, QR codes, or any other device capable of displaying a light and/or receiving commands. In at least one implementation, instead of an event-based interactive device, a QR code, RFID, or BLE chip can be present on an event-specific shirt or badge.

The event-based or other third-party application may comprise an application associated with a particular sports team, particular athlete, particular arena, particular venue, particular stadium, particular music performer, particular celebrity, particular brand, or any other particular entity or location of interest. For example, the event-based application may comprise a text message dialogue created by and focused on a music performer. The dialogue may request that a fan answer questions that request various user information, such as where the fan lives, the fan's birthday, the fan's income level, etc. The app may then be able to provide the fan with updates on the music performer's activities and provide the fan with concert information when the music performer is performing within a threshold distance of the fan's home address.

In at least one embodiment, the music performer's direct communication with the fan may also comprise an option for activating an event-based interactive device. For example, the event-based interactive device may comprise a bracelet with visible lights and a unique serial code notated on the outside of the bracelet. Activating the event-based interactive devices may comprise texting answers to questions from received on the user's mobile phone or within another third-party app. The responses, in the form of user information, are then sent to the device activation server.

As used herein, sending user information to the activation server can comprise the user's mobile phone directly sending the user information, the mobile phone commanding a remote server to provide the information to the activation server, the mobile phone providing a URL and necessary authentication information to the activation server so that the activation server can directly access the information at a remote server, the data input API scraping the data from the user's mobile device, or the mobile phone otherwise providing the activation server with access to the user information.

In at least one embodiment, the activation server then stores the user information and activates the event-based interactive device. Activating the event-based interactive device can comprise transmitting a device identifier to an interactive device control computer. The interactive device control computer may be located at the site of the specific concert or venue. Once the interactive device control computer receives that device identifier, it can send commands to the event-based interactive device that cause the lights on the event-based interactive device to light up at a certain pattern, in a certain color, or in some other certain way.

Additionally, in at least one embodiment, the activation server can also send to the interactive device control computer one or more specific user attributes for the user associated with a particular event-based interactive device. For example, the interactive device control computer may receive information about the user's birthday. At a particular point in the concert, the interactive device control computer can cause the event-based interactive devices of everyone who has a birthday within the week to light up a particular color.

Similarly, the user information can comprise the user's favorite song. When the song is played by the band, the interactive device control computer can cause the event-based interactive device to light up a particular color. For instance, in at least one embodiment, the lights can be configured to light up at a particular rhythm that is complimentary to the song that the band is playing. One will appreciate the crowd-wide effect that can be created by causing hundreds or thousands of event-based interactive devices to light-up in unison based upon common demographic information of the users and/or specific actions taken at the concert or venue (i.e., the playing of a particular song). As another example, at a sporting event, event-based interactive devices associated with specific fans can light-up when their team or favorite athlete scores a point.

In at least one embodiment, providing fans with the incentive of participating with the event-based interactive devices encourages the fans to activate the devices through the respective apps. This in turn requires the fans to engage with a third-party app, download an identified event specific app, create an account, respond to text message questions, and/or provide user information. Activating the event-based interactive device then sends the fan's user information to the activation server. As such, at least one embodiment of the present invention can provide celebrities and venues with information about the fans who actually attended a particular event.

Turning now to the figures, FIG. 1 depicts a schematic diagram of a system for activating and controlling event-based interactive devices 100. The depicted embodiment of the event-based interactive device 100 may comprise a unique device identifier (e.g., a QR code), LED lights, and a microcontroller. In alternative embodiments, the event-based interactive device 100 may comprise speakers, NFC technology, location tracking modules, and other common wearable technologies.

In the depicted embodiment, a fan activates the event-based interactive device 100 by taking a picture of the QR code with the fan's mobile phone 110. For example, the fan may be a fan of a particular soccer team and may be attending one of their games. To activate the event-based interactive device 100, the fan can launch a mobile app provided or endorsed by the soccer team, or another third-party app already in the user's phone. The mobile app may comprise an event-associated application. The mobile app can provide a specific function for activating the event-based interactive device 100. The function may be implemented through a third-party API that is integrated into the mobile app. This function may activate the camera on the mobile phone 110 and allow the fan to take a picture of the QR code. The mobile phone 110 can then communicate the QR code information to an activation server 130 through a network interface.

The use of a QR code to activate an event-based interactive device 100 is merely provided as an example. In alternate embodiments, activating an event-based interactive device 100 can be accomplished through a bar code, or other type of readable code, an NFC identifier that is broadcast by the event-based interactive device 100, a Bluetooth pairing function, a serial number that the user manually types into his mobile phone 110, or any other method of communicating a unique identifier associated with the event-based interactive device 100 to the activation server 130. For instance, in at least one embodiment, a user can text a serial number of the event-based interactive device 100 to a particular event phone number. The particular event phone number may be associated with the activation server 130, such that the activation server 130 can activate the event-based interactive device 100 based upon the received SMS or text message.

In at least one embodiment, the mobile app may also be in communication with a remote server 140. The remote server 140 may manage fan accounts for the soccer team. For example, in order to use the soccer team's app, the fan may be required to create an account. The account may request user information from the user. The user information and user account can be stored and managed within the remote server 140.

In at least one embodiment, in order to activate the event-based interactive device 100, the user may be required to provide some user information to the activation server 130. For example, the activation server 130 may request the fan's name, address, birthday, income level, prior purchase history, or any number of other attributes relating to the user that are available to the mobile app. The mobile app may provide the user information to the activation server 130 by downloading the information from the remote server 140 through a network connection 120a and sending the information directly from the mobile phone 110 to the remote server over the network connection 120b. In contrast, the mobile app may provide the user information to the activation server 130 by directing the remote server 140 to transmit the information directly to the activation server 130 through a network connection 120c, or by providing the activation server 130 with the necessary authentication credentials to directly access the information from the remote server 140 through a network connection 120c.

In at least one embodiment, the data input API can also be configured to scrape user information about the fan from the fan's mobile phone 110 or through other accounts that the fan is associated with. For example, the data input API may be capable of scanning the fan's contacts to gather additional user information about the fan. Additionally, the data input API may request the fan's login information for various social media websites. The data input API can then gather user information from the websites. In at least one embodiment, the data input API can also provide this user information to the activation server 130.

In an additional or alternative embodiment, the activation server 130 generates question text messages that are sent to the user. The question text messages each comprise one or more questions that request the desired user information. As the user provides the answers, the activation server 130 stores the user information. Additionally, in at least one embodiment, upon receiving the initial activation request from a user the activation server 130 queries the remote server 140 for information associated with the particular phone number that request the activation. The remote server 140 then provides the activation server 130 with any user information that is has associated with the particular phone number. For example, a user may be previously attended another event and already provided the user information. As such, the activation server 130 is able to leverage the previously provided information within sending the questions to the user.

Once the activation server 130 has received the unique identifier of the event-based interactive device 100 and the user information associated with the fan, the activation server 130 can communicate with an interactive device control computer 150. For example, the activation server 130 may communicate the unique identifier and one or more personal attributes of the fan to the interactive device control computer 150. For example, when setting up the interactive device control computer 150, a system administrator may identify particular fan attributes that the team wants to celebrate during the game. The administrator can then create a fan information request data structure that is transmitted to the activation server 130. The activation server 130 can then process the fan information request data structure and provide the requested information about each fan who has activated an event-based interactive device 100.

The interactive device control computer 150 may be located at the site of the particular soccer game. The interactive device control computer 150 may also be in communication with a transmitter 152. In at least one embodiment, the interactive device control computer 150 can communicate with the event-based interactive device 100 through the transmitter. For example, the interactive device control computer 150 may search through the user information of multiple fans and identify all of the fans who have attended every home game of the season. The interactive device control computer 150 can then cause all of the event-based interactive devices 100 associated with those fans to light up in a particular color and/or pattern.

Figure 2:
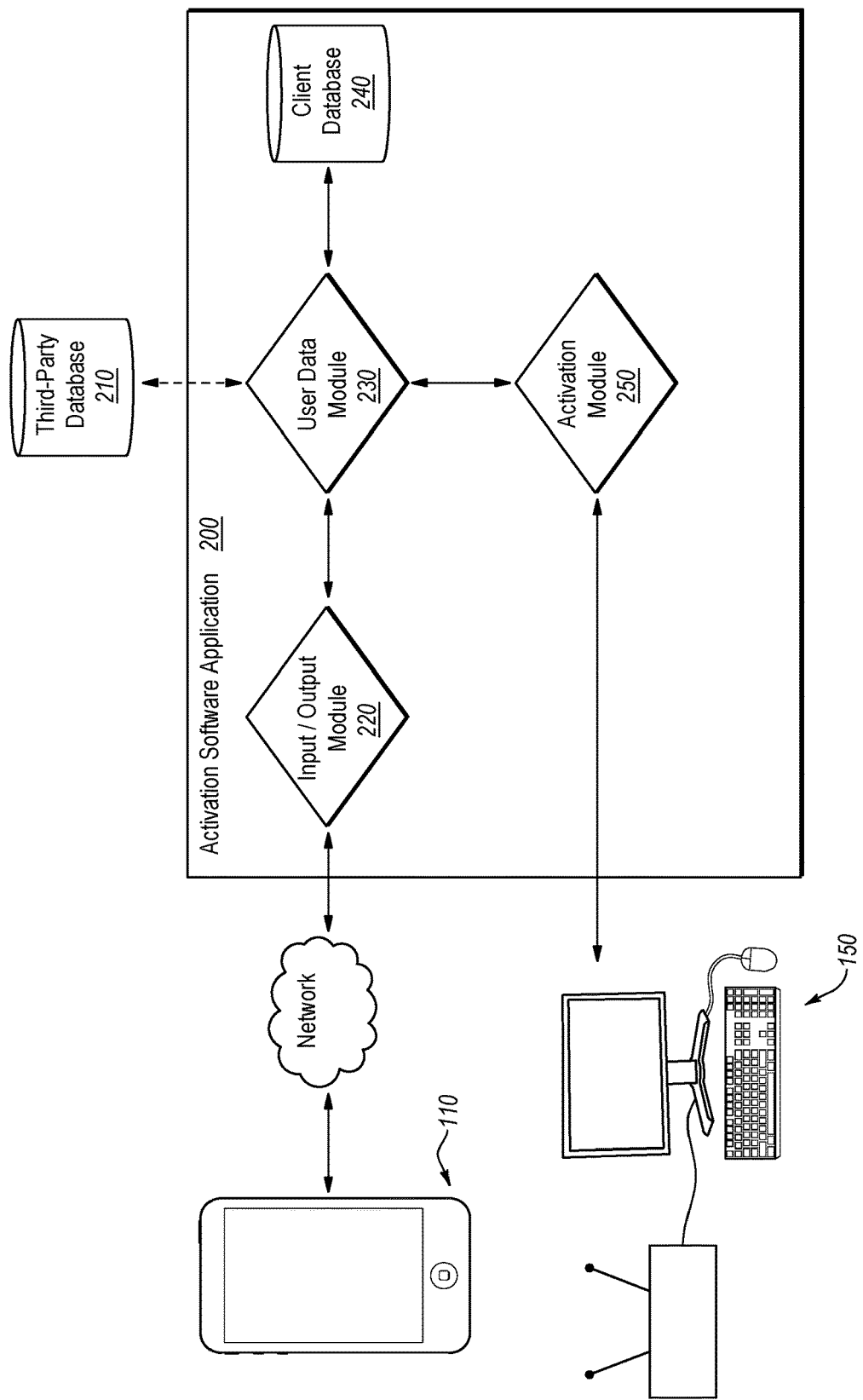
FIG. 2 illustrates a schematic diagram of an embodiment of an activation software application.

FIG. 2 depicts a schematic diagram of an embodiment of an activation software application 200 as would be executed by activation server 130. Additionally, FIG. 2 depicts various components 110, 150, 210 that the activation software application 200 communicates with. Further, the schematic depicts the activation software application 200 as comprising an input/output module 220, a user data module 230, a client database 240, and an activation module 250. However, one will understand that the depicted modules are provided only for the sake of example and clarity. Alternate embodiments may comprise additional and/or different modules that are otherwise interconnected but perform the same function as disclosed herein.

In at least one embodiment, upon receiving an activation request from a user's mobile device 110, the input output module 220 determines if the request is valid. A valid activation request may comprise a data structure that includes a unique identification for a particular event-based interactive device 100 and a user data indication. The input/output module 220 may comprise a data input API that provides a programming framework for integrating the activation server 200 within a mobile app and/or with an SMS texting service. The user data indication may comprise a data structure consisting of specific user information attributes associated with a particular fan. For instance, the data structure may be a static data structure that consists of data fields for a wide range of possible user information attributes. Depending upon the available information, the user's mobile device 110 can provide information within one or more of the data fields. In at least one embodiment, one or more of the user information attributes may be mandatory. For example, the fan's name, age, and home address may be mandatory in order to activate the event-based interactive device.

In contrast to directly transmitting a data structure within the user data indication, in at least one embodiment, the user data indication comprises a URL that directs the activation software application 200 to a third-party database 210 hosted on remote server 140. For example, a particular sports arena may provide fans with a custom app. The custom app may request the fans user information in order to create an account. The customized app may store that user information within a third-party database 210 in a remote server 140. As such, when activating the interactive event-based device, the customized mobile app can transmit to the input/output module 220 the URL and necessary authentication credentials to the third-party database 210. Accordingly, in various different embodiments, the activation software application 200 receives both a unique identifier associated with a particular event-based interactive device 100 and user information associated with the fan who is activating the device.

Once the input/output module 220 has received a valid authentication request, the request can be forwarded to a user data module 230. The user data module 230 can be configured to gather data from the third-party database 220, extract data from the data structure associated with the authentication request, or otherwise process user information associated with a fan who is trying to activate an event based interactive device. In at least one embodiment, the user data module 230 can store the user information within a client database 240.

Additionally, the user data module 230 can also search the client database 240 for previously stored user information. For example, the client database 240 may contain information from several different events, different fan groups, different user accounts, and various information otherwise gathered about individuals. As such, the user data module 230 can identify that a particular fan who is requesting to activate her event-based interactive device has previously stored information within the client database 240. In the case that a match is found, the user data module 230 can determine if any of the previously stored data is outdated or missing based upon the most recently received user information. The user data module 230 can then store the newly received information, from the activation request, within the previously stored user profile in the client database 240.

In at least one implementation, the user data module 230 is also configured to clean-up and format the user information that was received and otherwise gathered about the particular fan. In particular, the data can be prepared for entry into an analytics model of choice. Once the information is properly formatted, the user data module 230 can build the desired analytics model using the user information. Based upon the model, the user data module 230 can create predictions about the purchasing behavior and interests of the particular fan. Using the predictions, the user data module 230 can then be used to target the particular fan with specific advertisements and messages that may be of interest to the particular fan, as predicted by the analytics model. The advertisements and messages can be provided to the fan through the mobile app, through emails and other messages, or through other advertising avenues.

Once the user information has been properly stored the user data module 230 can send a validation command to the activation module 250. In response, the activation module 250 can send an activation command to the interactive device control computer 150. The activation command may comprise the device identifier that was received from the mobile device 110 and one or more personal attributes relating to the particular fan who activated the device.

The particular personal attribute information that is provided to the interactive device control computer 150 may be determined based upon a request by the interactive device control computer 150. For example, a particular band that is performing at a venue may desire to increase the sales of a particular piece of merchandise. As such, the interactive device control computer 150 can request user information relating to previous purchases that the fans have made at similar events.

The information request can be processed by user data module 230 which can extract the requested information from the client database 240. The activation model 250 can then send the requested information to the interactive device control computer 150. In at least one embodiment, the user information and the unique device identifier are transmitted within a single data structure. In contrast, in at least one embodiment, the unique device identifiers are transmitted to the interactive device control computer as soon as they are authenticated. The requested user information, however, can be transmitted later as bandwidth allows.

Figure 3:
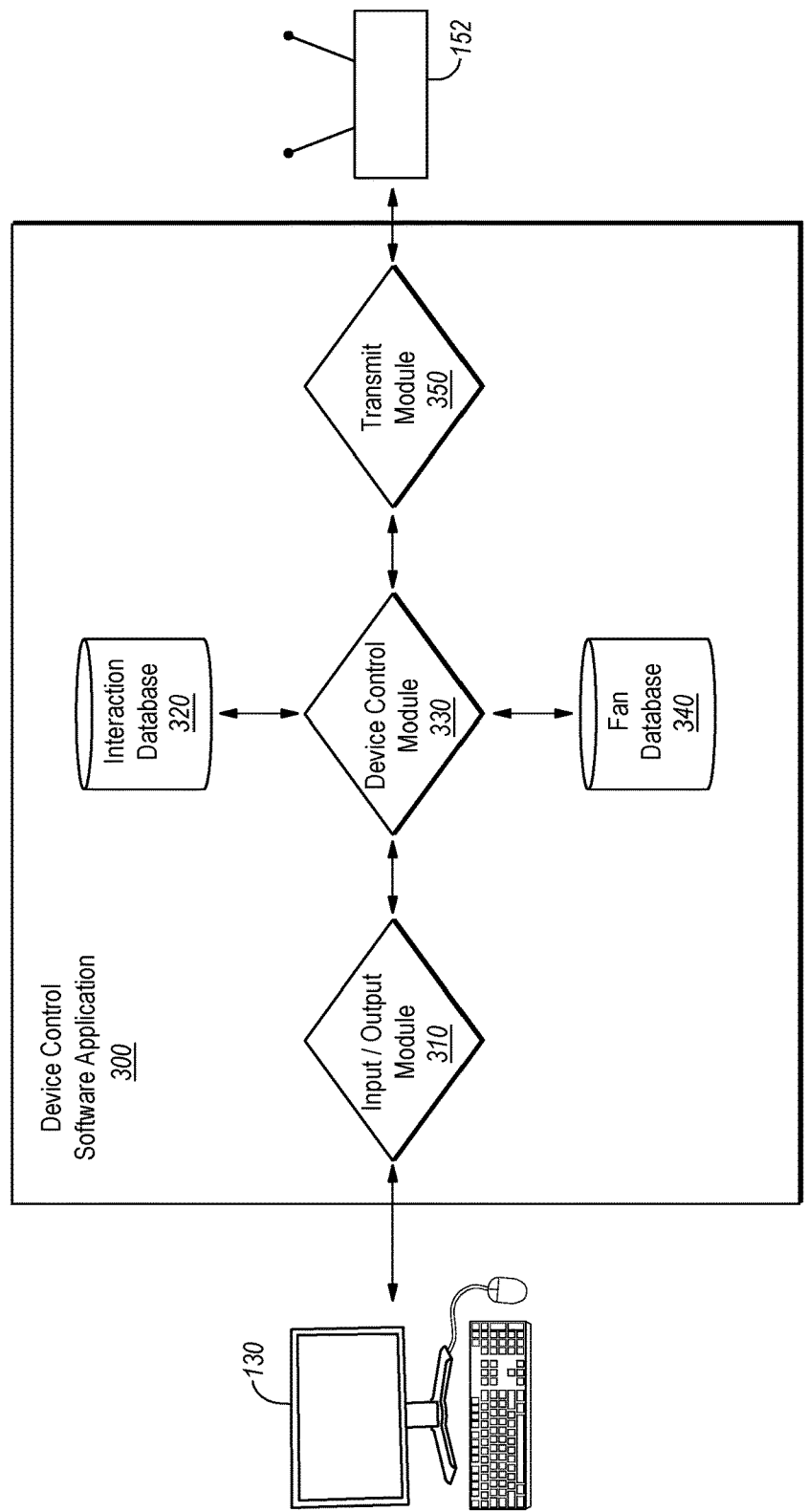
FIG. 3 illustrates a schematic diagram of an embodiment of a device control software application.

FIG. 3 depicts a schematic diagram of a device control software application 300 that is executable within the interactive device control computer 150. The device control software application 300 may be in communication with the activation server 130 and a transmitter 152. Additionally, the device control software application 300 may comprise various exemplary modules, including, an input/output module 310, an interaction database 320, a device control module 330, a fan database 340, and a transmit module 350.

In at least one embodiment, upon receiving an authentication command and fan user information from the activation server 130, the input/output module 310 can provide the information to the device control module 330. The device control module may comprise various processors and logic necessary to parse data and execute commands. In at least one embodiment, the device control module 330 can store the user information within the fan database 340. As discussed above, the user information may comprise a specific subset of information that was previously requested by the interactive device control computer 150 administrator.

The device control module 330 can also be configured to pre-assign various different unique device identifiers (and their respective fans) into pre-defined groups. In at least one embodiment, the interaction database 320 may be used by the interactive device control computer 150 administrator to store potential groups of interest. For example, a sports team may want to recognize fans who live in another state, fans who donated to a particular charity, fans who are single, fans who tend to purchase large amounts of concessions, and the favorite athletes of each respective fan. Each of these pieces of user information can be requested by the interactive device control computer 150 from the activation server. The device control module 330 can then group each respective fan (and their associated unique device identifier) into respective groups based upon these interests. For example, all of the fans whose favorite athlete is John Doe can be grouped within a single group. These groups can be stored within the interactive database 320.

During the sporting event, the interactive device control computer 150 administrator may desire to recognize one or more of these particular groups. The administrator can issue a command to the interactive device control computer 150 to activate light displays on all event-based interactive devices 100 that fall within the desired group. In at least one embodiment, this command is issued by the transmit module 350 which is in communication with a transmitter 152. The transmitted command may comprise a multicast broadcast that comprise a device data structure. The device data structure may comprise the unique device identifiers for each device within the group of interest along with specific display parameters, such as pattern and color.

In contrast, in at least one embodiment, as soon as the device control module 330 identifies that a particular event-based interactive device 100 falls within group of interest, the transmit module 350 can transmit a command to that specific band to store a particular variable that is associated with that group of interest. For example, the variable may comprise a predetermined numerical code that is associated with all event-based interactive devices in the particular group. The transmit module may also transmit to the specific band a particular color or pattern to associate with the numerical code. In this embodiment, when the administrator desire to recognize a particular group of fans, the transmit module can just transmit the particular code. All crowd-based interactive device that have the particular code stored can then actuate their respective light displays in accordance with the previously stored pattern and/or color.

In various additional embodiments, event-based interactive devices 100 may also comprise the ability to track fan purchases within a particular venue. For example, when purchasing merchandise, a discount may be provided if the purchaser scans their QR code. The user's purchase information can then be sent to the activation server 130 for storage. Additionally, in at least one embodiment, the event-based interactive devices 100 may comprise NFC technology, Bluetooth Technology, or some other communication technology, that allows the device to be tracked without user interaction. For example, antennas may be positioned near concession areas that can associate fans with individual purchases.

Further, in at least one embodiment, the event-based interactive devices 100 can be utilized to manage the purchase of concessions and/or merchandise. For example, when activating an event-based interactive device 100, the activation server 130 can also determine if the fan is old enough to be served alcohol. This secondary verification of age can then be transmitted to the event-based interactive device 100. In such a case, prior to being served alcohol, the fan can scan their QR code to prove that they are of age.

In at least one embodiment, the event-based interactive device 100 can be programmed to blink a particular color, based upon legal drinking age, whenever the fan is detected to be near alcohol concessions. For example, a short range antenna that broadcasts a particular code can be positioned near areas that sell alcohol. The event-based interactive devices 100 can be programmed to blink a particular color based upon the age of the wearer whenever the particular code is detected. For instance, the event-based interactive devices 100 may flash red when the wearer is underage and may flash green when the wearer can legally drink alcohol.

Accordingly, embodiments of the present invention provide novel and innovative systems and methods for activating event-based interactive devices 100. Additionally, embodiments of the present invention provide strong incentives for fans to activate the event-based interactive devices 100. The act of activating the respective event-based interactive devices 100 allows embodiments of the present invention to track information about individuals who attend various events.

Figure 4:
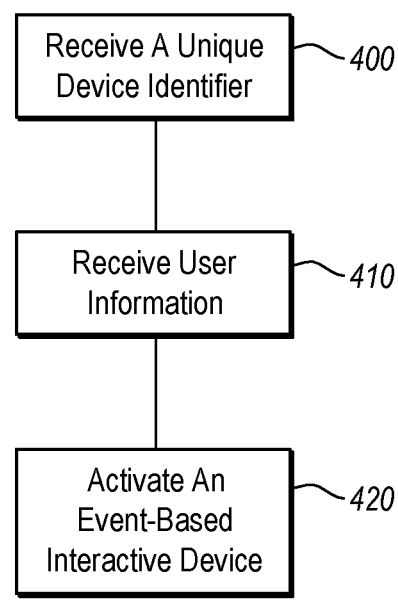
FIG. 4 illustrates a flowchart of steps in a method for activating and controlling event-based interactive devices.

FIG. 4 illustrates a flowchart of steps in a method for activating and controlling event-based interactive devices in accordance with embodiments of the present invention. In particular, FIG. 4 shows that a method for activating and controlling event-based interactive devices can include an act 400 of receiving a unique device identifier. Act 400 can comprise receiving, through a data input API, a unique device identifier. The unique device identifier may be associated with the event-based interactive device. For example, in FIGS. 1 and 2, and the accompanying description, the activation server 130 receives an activation request from a user's mobile device 110. The activation request can comprise a unique device identifier, such as a serial number that is texted to an event phone number. The activation request may be processed by a data input API that is managed by the input/output module 220. The event-associated application may comprise a mobile app that was created by a particular band, sports team, stadium, venue, etc.

FIG. 4 also shows that the method can include an act 410 of receiving user information. Act 410 can comprise receiving user information associated with a user of the event-based interactive device. The user information can be provided by a server associated with the event-based application. The user information comprises one or more user attributes associated with the user. For example, in FIG. 1 and the accompanying description, an event-based application executed on the user's mobile device 110 can gather information from a remote server 140 that is associated with the event-based application, or the event-based application can provide the activation server 130 with a URL necessary to access the information directly from the remote server 140.

Further, FIG. 4 shows that the method can include an act 420 of activating an event-based interactive device. Act 420 can comprise transmitting the unique device identifier to an interactive device control computer. The interactive device control computer can be in communication with a transmitter that is configured to transmit commands to the event-based interactive device. For example, in FIGS. 1 and 3, and the accompanying description, the activation server 130 can communicate a unique device identifier to an interactive device control computer 150. Additionally, the activation server 130 can communicate various requested personal attributes associated with the user of each respective interactive device to the interactive device control computer 150. The interactive device control computer 150 can then send commands to the interactive devices based upon common user information attributes.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A computer system for activating an event-based interactive device, comprising:
one or more processors; and
one or more computer-readable media having stored thereon instructions that when executed by the one or more processors configure the computer system to perform at least the following:
receive, from a mobile device, a unique device identifier, wherein:
the unique device identifier is associated with the event-based interactive device,
the mobile device is a separate device from the event-based interactive device, and
the unique device identifier is received through a first communication channel type;
receive user information associated with a user of the event-based interactive device, wherein the user information comprises one or more user attributes associated with the user;
classify multiple event-based interactive devices into discrete groups, wherein at least one group is defined based upon a common user attribute that is shared by users of each event-based interactive device within the at least one group; and
transmit a command to the at least one group, wherein:
the command is communicated through a transmitter, the transmitter being separate from the mobile device and the event-based interactive device,
the transmitter communicates the command through a multicast broadcast, wherein the multicast broadcast is communicated through a second communication channel type that is separate and distinct from the first communication channel type, and
the command is configured to cause each event-based interactive device within the at least one group to activate an indicator that indicates each user within the group shares the common user attribute.

2. The computer system recited in claim 1, wherein receiving a unique device identifier comprises receiving an activation text message with a particular identifier that is associated with the event-based interactive device, wherein the activation text message originated from a particular phone number.

3. The computer system recited in claim 2, wherein receiving user information associated with the user of the event-based interactive device comprises:
accessing an event-specific question database, wherein the event specific question database comprises one or more questions directed towards users at an event;
generate a question text message that recites a question from the one or more questions;
transmit the question text message to the particular phone number;
receive an answer to the question text message; and
store the answer as a particular user attribute within the user information.

4. The computer system recited in claim 2, the instructions further including instructions that when executed configure the computer system to:
search a database for stored user information associated with the particular telephone number; and
identify that the particular telephone number is associated with information already stored within the user information.

5. The computer system recited in claim 4, the instructions further including instructions that when executed configure the computer system to:
determine that the information already stored within the user information provides acceptable answers to a specific question with an event-specific question database; and
classify the event-based interactive device based upon the information already stored within the user information.

6. The computer system recited in claim 1, wherein the user information is received directly from a user mobile device.

7. The computer system recited in claim 1, wherein the unique device identifier comprises a serial number printed on the event-based interactive device.

8. A system for utilizing an event-based interactive device, comprising:
an event-based interactive device comprising:
a unique device identifier,
a first receiver configured to receive multi-cast communications from a transmitter on a first communication channel type, and
a visual display device;
a device activation server configured to receive the unique device identifier and activate the event-based interactive device, the device activation server comprising:
a user information database,
a communication channel with a mobile phone, the mobile phone communicating the unique device identifier through a second communication channel type;
an interactive device control computer in communication with the device activation server and configured to:
receive unique device identifier from the device activation server, and
communicate commands to the event-based interactive device, the commands communicated through a transmitter, the transmitter being separate from the mobile device and the event-based interactive device and the transmitter communicating the commands through a multicast broadcast, wherein the multicast broadcast is communicated through the first communication channel type that is separate and distinct from the second communication channel type.

9. The computer system recited in claim 8, wherein the interactive device control computer is further configured to receive from the device activation server one or more attributes associated with the user of the event-based interactive device.

10. The computer system recited in claim 9, wherein the interactive device control computer is further configured to send a specific command to a group of event-based interactive devices associated with different users based upon the different users having common attributes, which common attribute is indicated by information received from the device activation server.

11. The computer system recited in claim 8, wherein the device activation server receives the unique device identifier through a text message from a mobile phone.

12. The computer system recited in claim 8, wherein the visual display device comprises an LED matrix.

13. The computer system recited in claim 8, wherein the interactive device control computer is further configured to identify groups of unique device identifiers that are associated with users who have particular attributes in common.

14. The computer system recited in claim 13, wherein the interactive device control computer is further configured to transmit commands to a specific group event-based interactive devices.

15. The computer system recited in claim 13, wherein the interactive device control computer is further configured to transmit commands to a specific group event-based interactive devices.

16. The computer system recited in claim 8, wherein the unique device identifier comprises a serial number.

17. The computer system recited in claim 8, wherein the unique device identifier comprises a serial number.

18. A method for utilizing an event-based interactive device, comprising:
   receiving, from a mobile device, a unique device identifier, wherein:
      the unique device identifier is associated with the event-based interactive device,
      the mobile device is a separate device from the event-based interactive device, and
      the unique device identifier is received through a first communication channel type;
   receiving user information associated with a user of the event-based interactive device, wherein the user information comprises one or more user attributes associated with the user; and
   transmitting the unique device identifier to an interactive device control computer, wherein the interactive device control computer is in communication with a transmitter that is configured to transmit commands to the event-based interactive device, the transmitter being separate from the mobile device and the event-based interactive device, and the transmitter communicates a command through a multicast broadcast, wherein the multicast broadcast is communicated through a second communication channel type that is separate and distinct from the first communication channel type.

19. The method as recited in claim 18, wherein receiving the unique device identifier comprises receiving the unique device identifier through a text message from a mobile phone.

20. The computer system recited in claim 18, wherein the interactive device control computer is further configured to identify groups of unique device identifiers that are associated with users who have particular attributes in common.

* * * * *